July 21, 1925.

A. F. PEACOCK 1,546,672

CLUTCH MECHANISM FOR TRANSMISSION

Filed Feb. 4, 1924

INVENTOR
A. F. Peacock
BY
ATTORNEYS

July 21, 1925.                                                  1,546,672
A. F. PEACOCK
CLUTCH MECHANISM FOR TRANSMISSION
Filed Feb. 4, 1924                         3 Sheets-Sheet 3
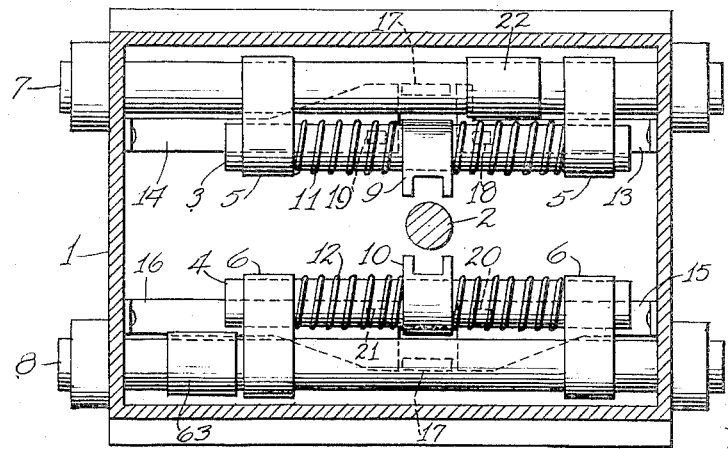
Fig. 3.
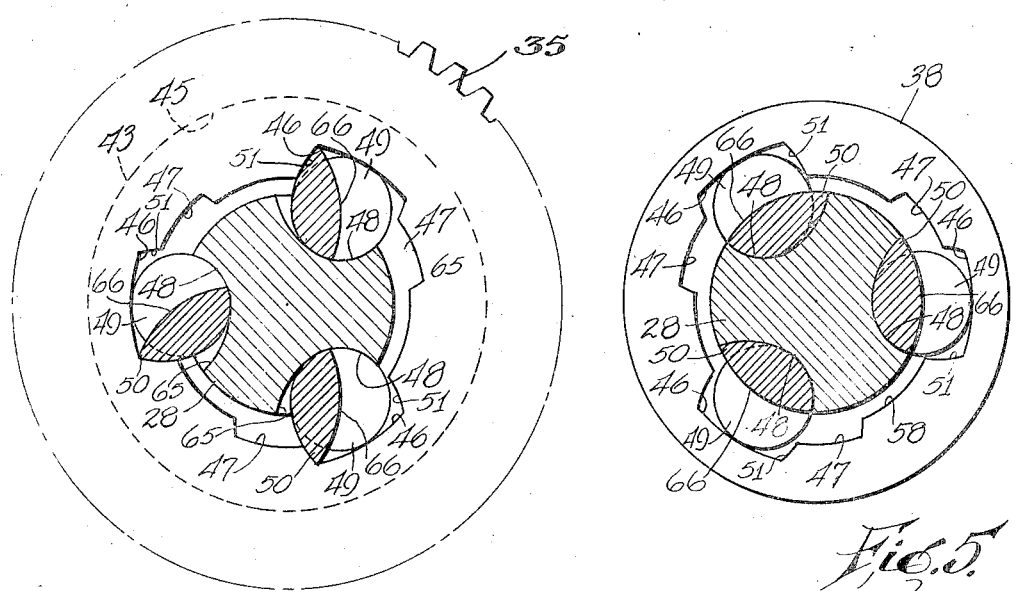
Fig. 4.
Fig. 5.
INVENTOR
A. F. Peacock
BY
ATTORNEYS Patented July 21, 1925.

1,546,672

UNITED STATES PATENT OFFICE.

ALBERT F. PEACOCK, OF BUCHANAN, MICHIGAN.

CLUTCH MECHANISM FOR TRANSMISSION.

Application filed February 4, 1924. Serial No. 690,587.

*To all whom it may concern:*

Be it known that I, ALBERT F. PEACOCK, a citizen of the United States, and a resident of Buchanan, in the county of Berrien and State of Michigan, have invented a new and useful Improvement in Clutch Mechanism for Transmissions, of which the following is a full, clear, and exact description.

My invention relates to improvements in transmission mechanisms, and it consists in the combinations, constructions, and arrangements herein described and claimed.

An object of my invention is to provide a transmission mechanism in which all of the gears are constantly in mesh with each other, and which has positive means for connecting the engine shaft with the propeller shaft by any one of these sets of gears.

A further object of my invention is to provide a transmission mechanism in which the engagement of the gears with the shaft that actuates the propeller shaft is effected by positive means, thereby obviating the necessity of using springs or the like.

Other objects and advantages will appear in the following specification, and the novel features of the invention will be particularly pointed out in the appended claims.

My invention is illustrated in the accompanying drawings forming part of this application, in which Figure 1 is a vertical section through the device, portions thereof being shown in elevation.

Figure 3 is a section along the line 3—3 of Figure 1,

Figure 4 is a section along the line 4—4 of Figure 1,

Figure 5 is a section along the line 5—5 of Figure 1,

Figure 6 is a side elevation of a portion of the device, and

Figure 7 is an end view of Figure 6.

Figure 1:
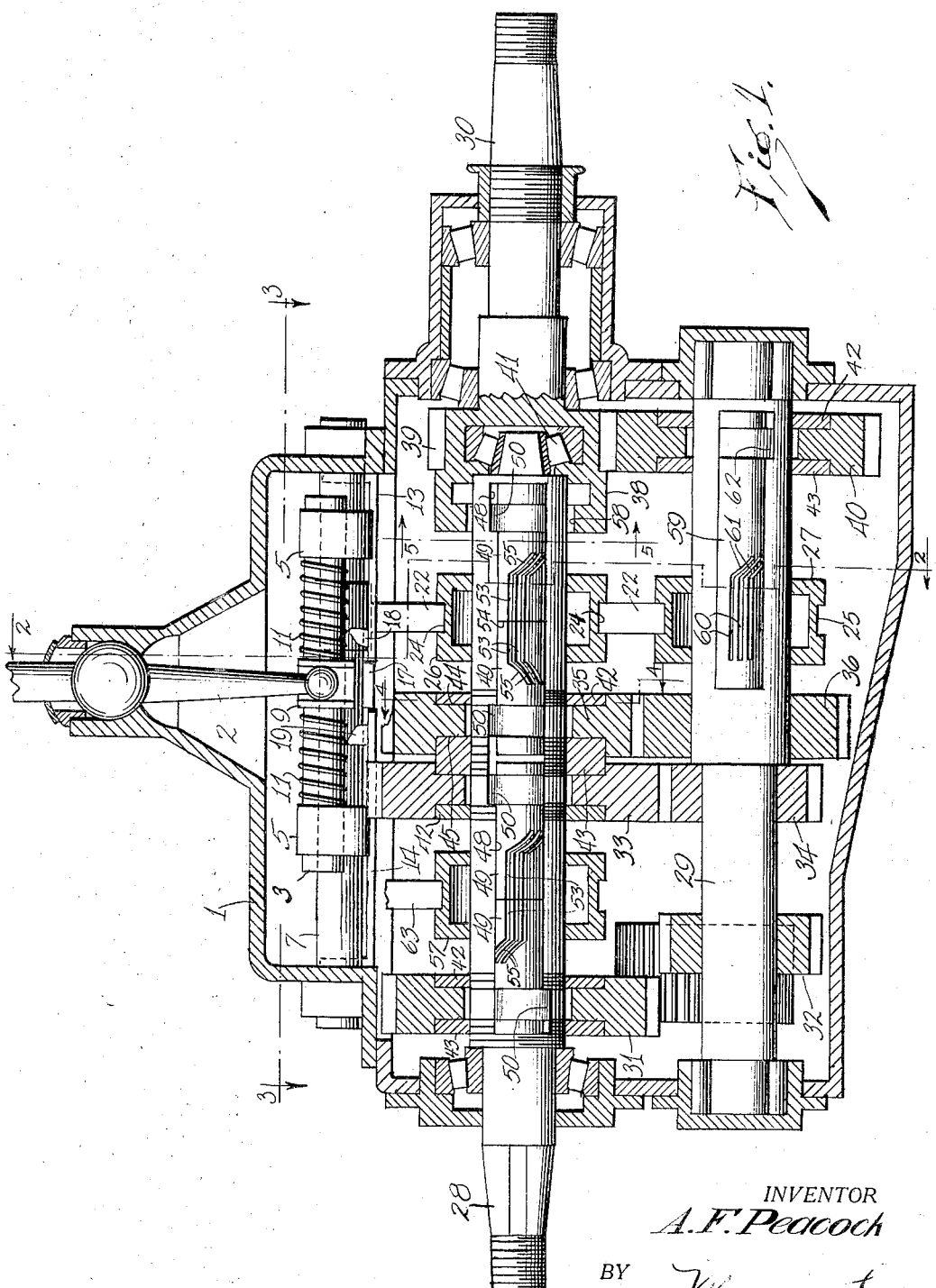

In carrying out my invention I provide a casing indicated generally at 1 which carries a gear shift lever 2 and a shifting mechanism, as clearly shown in Figure 3. The shifting mechanism comprises a pair of small rods 3 and 4 that are carried by the arms 5 and 6. The arms in turn are rigidly secured to long rods 7 and 8, these rods being slidably carried by the casing 1. The rods 3 and 4 have forks 9 and 10 which are disposed on each side of the lever 2. The gear shaft lever 2 is actuated in the ordinary manner and when swung into engagement with the fork 9 is adapted to move the rod 3 in either direction to throw the mechanism hereafter described into second or third speeds. In like manner, the rod 4 when moved, is adapted to throw the mechanism into reverse and first speeds.

Springs 11 and 12 are carried by the rods 3 and 4 and are disposed between the forks and the arms in the manner disclosed in the drawing. The springs are adapted to be placed under tension when the rods 3 and 4 are moved with respect to the arms 5 and 6 respectively. The rods 3 and 4 are loosely mounted in the arms 5 and 6. In Figure 1 I have shown the means for preventing movement of the rods 7 and 8 until the rods 3 and 4 have been moved a predetermined distance. The rods 3 and 4 are merely for the purpose of permitting the lever to be moved a certain distance before the rods 7 and 8 will be actuated. The rods 7 and 8 are directly connected to the transmission mechanism beneath, as will hereinafter be described.

Means for locking the rods 7 and 8 against movement until the rods 3 and 4 have been moved a predetermined distance comprises leaf springs 13 and 14 which are disposed beneath the rod 3 and leaf springs 15 and 16 that are disposed beneath the rod 4. The springs 13 and 14 are adapted to abut the projection 17 on the rod 7 so as to prevent the normal movement of the rod 7. As clearly shown in Figure 1 the springs 13 and 14 have lugs 18 and 19 that are adapted to be engaged by the fork 9 when the latter has been moved a certain distance in either direction. This movement of the fork 9 before it reaches the lugs 18 or 19 is sufficient to compress either of the springs 11. When the fork 9 engages with the lugs 18 or 19, it flexes the springs so as to release the springs from the projection 17. The spring 11 being under tension will cause the arm 5 to quickly move the rod 7 in the same direction as the rod 3 was previously moved. It will therefore be apparent from this construction that I have provided a novel means for actuating the rods 7 and 8 quickly, and after the lever 2 has been moved a predetermined distance.

The leaf springs 15 and 16 are provided with lugs 20 and 21, these lugs flexing the springs in the same manner as the lugs 18 and 19 flex the springs 13 and 14. The action of the rods 4 and 8 is identical to the action of the rods 3 and 7.

Figure 2:
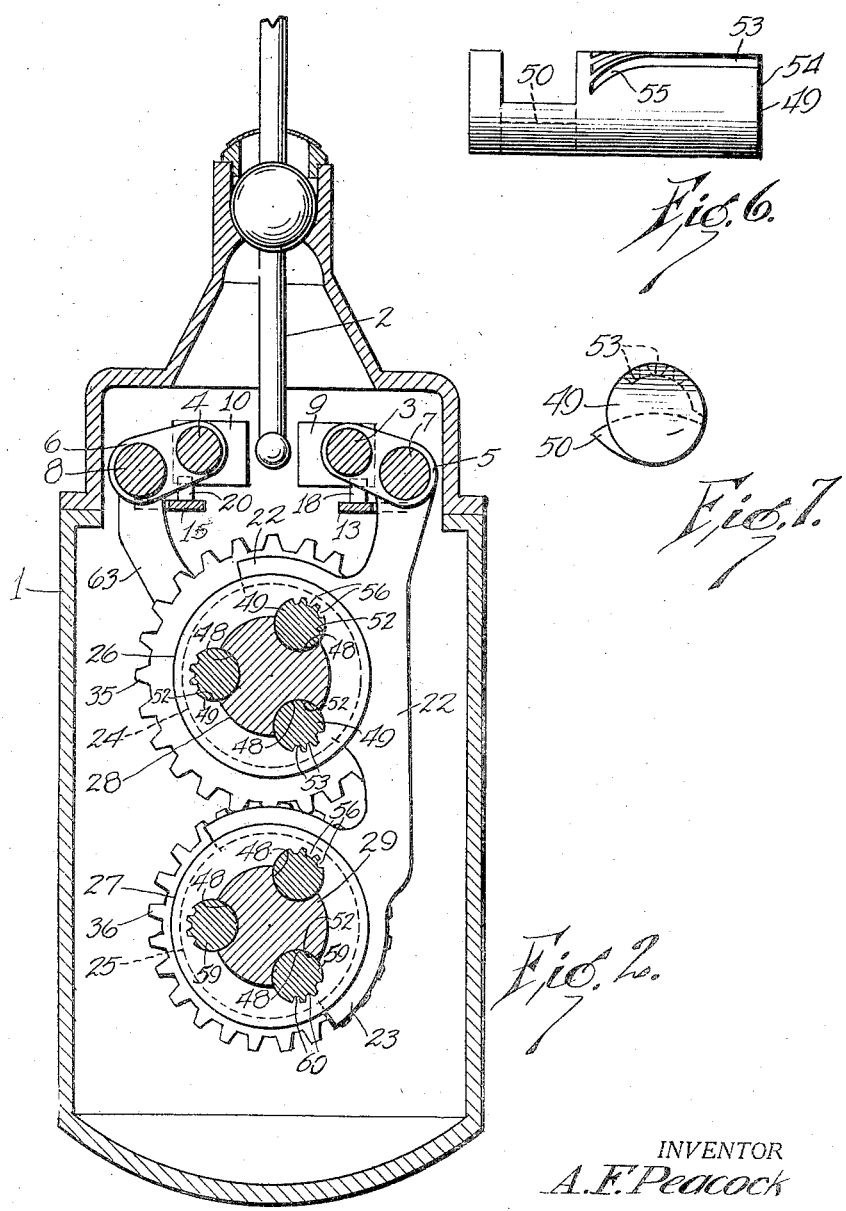
Figure 2 is a sectional view along the line 2—2 of Figure 1.

It will be noted from Figures 2 and 3 that the rod 7 is provided with an arm, this arm being provided with two arcuate-shaped fingers 22 and 23 that are received in grooves 24 and 25 of collars 26 and 27. In Figure 1 it will be seen that the collars 26 and 27 are slidably mounted upon shafts 28 and 29 respectively, the shafts being carried by the casing 1. The shaft 28 is connected to the propeller shaft of the car (not shown) while the shaft 29 is an idler shaft and carries the necessary gears that effect the different speed connections between the shaft 30 that is connected to the engine and the shaft 28.

The disclosed mechanism is provided with four sets of gears, gears 31 and 32, constituting the reverse speed; gears 33 and 34, first speed; gears 35 and 36, second speed; and a mechanism 38, hereafter described that constitutes third or high speed. The shaft 29 is driven by the shaft 30 through the medium of gears 39 and 40. It will also be noted that the inner end of the shaft 28 is rotatably carried by the shaft 30 and is supported by a ball bearing race 41. The gears 31 and 32, 33 and 34, 35 and 36, 39, and 40, are always in mesh with each other.

The gears 31, 33, and 35, however, are loosely mounted upon the shaft 28, and therefore may be rotated by the gears 32, 34, 36, respectively, without in turn rotating the shaft 28.

The means for causing the engagement of the gears 31, 33, and 35, with the shaft 28 will now be described. Since the means for effecting this engagement is the same for each gear, a description of one of the gears and its associate mechanism will be sufficient. Take for example, the gear 35, which in the present instance is one of the gears in the second speed shift. This gear is carried by the discs 42 and 43 that are disposed in recesses 44 and 45 in the gear 35. The discs 42 and 43 are threaded to the shaft 28. The gear 35 is adapted to rotate on these discs, and therefore does not frictionally engage with the shaft 28. The bore of the gear 35 is clearly shown in Figure 4 of the drawings. It will be noted from this figure that a number of recesses 46 are provided and a number of smaller recesses 47, the smaller recesses communicating with the larger ones. The shaft 28 has grooves 48 therein, these grooves receiving gear engaging dogs 49. The dogs 49 have offset portions 50 that are adapted to be swung into the recesses 46 when the dogs are rotated by a means hereinafter described. The side walls 51 of the recesses 46 are fashioned so as to engage with the outer surface of the dogs 50, whereby a positive connection is provided between the dogs and the gear when the dogs are swung into the position shown in Figure 4. It will further be noted from this figure that two of the projections 50 engage with one side of the recesses 46, while the other projection engages with the opposite side. This construction locks the gear 35 to the shaft 28 and prevents the gear from rotating in either direction with respect to the shaft.

The dogs 49 are rotated by the collar 26. In Figure 2 I have shown the collar 26 provided with recesses 52. The dogs 49 are slidably disposed in these recesses and prevent the collar 26 from rotating with respect to the shaft 28. Each of these dogs 49 is provided with grooves 53. In Figure 1 I have shown the grooves 53 extending longitudinally from the end 54 of the dog for a certain distance, and then inclined at 55. The collar 26 has teeth 56 that are slidably disposed in the grooves 53. When the collar 26 is moved with respect to the dogs 49, it will rock the dogs 49 when the teeth of the collar pass into the inclined portions 55. This rocking movement is sufficient to cause the projections 50 to enter the recesses 46. It will therefore appear from Figure 1 that a movement of the collar 26 toward the gear 35 will rock the dogs 49 so as to lock the gear 35 to the shaft 28. As soon as the gear 35 is locked to the shaft 28, the shaft 28 will be rotated by the shaft 30. The connection between the shaft 30 and the shaft 28 in this instance is provided by the gears 39 and 40 and the gears 35 and 36.

In the same manner as the gear 35 is locked to the saft 28, the gears 31 and 33 are locked to the shaft. The dogs 49 that engage with the gears 31 and 33 are rocked by means of a collar 57 in the same manner as the collar 26 locks the dogs to the gear 35. The ends of the dogs that lock the gears 31 and 33 to the shaft 28 abut each other and are actuated by the same collar 57. When the collar 57 is moved toward the gear 31, it will cause the dogs to lock the gear to the shaft, and when moved toward the gear 33 will cause the other set of dogs to lock this gear to the shaft.

As heretofore stated, the shaft 30 receives the inner end of the shaft 28. This end is adapted to be locked to the shaft 30 in the same manner as the gears are locked to the shaft 28. The bore 58 in the shaft 30 is shaped in identically the same manner as the bore of the gear 35. The dogs 49 are adapted to enter the recesses in this bore and thereby lock the shaft 30 directly to the shaft 28. The shaft 28 is locked to the shaft 30 when the collar 26 is moved toward the shaft 30. From the construction described thus far, it will be noted that two collars 26 and 57 are sufficient for the four speeds of the device.

I also provide a means for stopping the rotation of the shaft 29 when the shaft 28 is connected directly to the shaft 30. This means comprises a mechanism identical to the mechanism that connects the gear 35 to the shaft 28. The dogs 59 disconnect the gear 40 from the shaft 29 when the collar 27 is moved toward the gear 40. The dogs 59 are provided with grooves 60 that have inclined portions 61. The dogs also have projections 62 that engage with the gear 40. When the collar 26 is moved toward the shaft 30, the collar 27 will also be moved toward the gear 40 and will rotate the dogs 59 so as to release the gear from the shaft. The gear will now rotate idly upon the shaft.

From the foregoing description of the various parts of the device, the operation thereof may be readily understood. Assume that the engine of the car is started and that the driver wishes to shift from neutral into first speed. The gear shift lever 2 is actuated in the ordinary manner and engages with the fork 10 and moves the fork so as to compress the spring 12. After the spring has been compressed, the leaf spring 15 is depressed in the manner heretofore described, and releases the rod 8, whereupon the rod 8 is quickly thrown in the direction of the arrow, as shown in Figure 3.

This movement causes the arm 63 to be moved, the arm in turn moving the collar 57 toward the gear 33. When the collar 57 is moved toward the gear 33, it will cause the dogs 49 to engage with the gear 33 and lock the gear to the shaft 28. The device is now in first speed.

If now the operator wishes to shift from first to second, he swings the lever 2 so as disengage the fork 10 and to engage with the fork 9. After the fork 9 has been moved a predetermined distance in the required direction, it will cause the rod 7 to move, which in turn will move the collar 26 toward the gear 35. The gear 35 is a second speed gear and is thrown in mesh with the shaft 28 when the collar 26 is moved toward it. The device is now in second speed. In like manner, the car may be shifted from second to third or from first to reverse. It should be noted that during each operation the shaft 28 is disconnected from the shaft 30 or in other words, the device is in neutral.

The recesses 47, (see Figure 4) are provided so as to permit the gear 35 to move slightly with respect to the shaft 28, when shifting from third speed to second speed. It will be noted that when the shaft 28 is connected directly to the shaft 30 the second speed gear 35 is not being rotated. However, in shifting from third speed to second speed, the gear 35 is set in rotation as soon as the dogs 49 have released the third speed device from the shaft 28. For an instant the shaft 28 will be rotated at a higher speed than the gear 35. If the dogs 49 are swung into engagement with the gear 35 during this instant, they might fail to enter the recesses 46. By providing the recesses 47 that communicate with the recesses 46, the projections 50 are given a much greater space in which to enter the recesses 46. In case the dogs should enter the recesses 47 and the gear should be rotating at a slower speed than the shaft 28, the projection 50 would merely move in the recesses 47 until they abut the radially extending wall of the recess 47. The shaft 28 will quickly slow up since it is connected to the rear axle of the car and therefore the projection 50 will move into the recesses 46 as soon as the shaft 28 is rotated at the same speed as the gear 35. The projections 50 will lock the gear to the shaft in the manner heretofore described. Two of the projections 50 engage with the gear 35 to move the gear in the required direction, while one of the projections engages with the gear to prevent the gear from rotating in the reverse direction. As heretofore stated, the recess formed by the combined recesses 46 and 47 gives ample space for the dogs to be thrown into engagement with the gears, even though the shaft 28 is rotating at a different speed from that of the gears.

It will be noted from the preceding description that the means for locking the gears to the shaft 28 is positive, and does not depend on springs or other like construction. As many grooves as desired may be provided in the shaft 28, whereby the number of gear engaging dogs may be increased at will. The gear engaging dogs are small and do not extend beneath more than one gear, whereby all of the grooves that are beneath one gear may receive dogs that operate on that gear and none other. The back lash of the gear 35 and any of the other gears is prevented by the relatively large recess which is provided in the gears, this recess communicating with the bore of the gear. The collar actuating mechanism provides a novel means for moving the collars quickly so as to instantly connect the gears with the shaft. This quick movement does not depend upon the swinging of the lever 2, and it will therefore be apparent that the lever 2 may be actuated in the ordinary manner, but still the engagement of the gears with the shaft 28 will be quickly effected.

It will be noted from Figure 4 that the projections 50 are received in recesses 65 when the locking dogs 49 are in inoperative position. The dogs are cut away at 66 to permit the gear to rotate with respect to the shaft 28 when the dogs 49 are in inoperative position.

I claim:

1. In a transmission mechanism, a shaft, a gear loosely mounted on said shaft, dogs for locking said gear to said shaft to prevent rotation of said gear in either direction with respect to said shaft, said dogs having cam grooves therein, and a dog actuating member having teeth slidably received in said grooves, said member when moved throwing said dogs into engagement with said gear.

2. In a transmission mechanism, a shaft, a gear loosely mounted on said shaft, dogs for locking said gear to said shaft, said dogs projecting beyond the periphery of said shaft, and a dog actuating sleeve slidably mounted on said shaft and said dogs, said dogs preventing the rotation of said sleeve with respect to said shaft.

3. In a transmission mechanism, a shaft, a gear loosely mounted on said shaft, dogs for locking said gear to said shaft and having cam grooves therein, said dogs extending beyond the periphery of said shaft, and a dog actuating sleeve slidably mounted on said shaft and on said dogs, said sleeve having teeth adapted to ride in said grooves, said teeth being adapted to rock said dogs into engagement with said gear when said sleeve is moved longitudinally with respect to said shaft.

ALBERT F. PEACOCK.